(12) United States Patent
Pike (10) Patent No.: US 9,171,546 B1
(45) Date of Patent: Oct. 27, 2015

(54) PERFORMING FUNCTIONS BASED ON COMMANDS IN CONTEXT OF TELEPHONIC COMMUNICATION

(75) Inventor: Geoffrey Roeder Pike, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1051 days.

(21) Appl. No.: 13/074,751

(22) Filed: Mar. 29, 2011

(51) Int. Cl.
G10L 15/26 (2006.01)
G10L 15/22 (2006.01)
H04M 3/50 (2006.01)

(52) U.S. Cl.
CPC ............. *G10L 15/265* (2013.01); *H04M 3/50* (2013.01); *G10L 2015/223* (2013.01)

(58) Field of Classification Search
CPC ... G10L 17/06; G10L 15/22; G10L 2015/223; G10L 15/265; H04M 3/50
USPC .......................................... 704/251, 270, 275
See application file for complete search history.

(56) References Cited

U.S. PATENT DOCUMENTS

| 2005/0091059 | A1* | 4/2005 | Lecoeuche | 704/270.1 |
| 2008/0015863 | A1* | 1/2008 | Agapi et al. | 704/275 |
| 2009/0177476 | A1 | 7/2009 | Darrell et al. | |
| 2009/0204410 | A1 | 8/2009 | Mozer et al. | |
| 2009/0234655 | A1* | 9/2009 | Kwon | 704/270.1 |
| 2010/0088100 | A1* | 4/2010 | Lindahl | 704/270.1 |
| 2011/0112827 | A1* | 5/2011 | Kennewick et al. | 704/9 |

OTHER PUBLICATIONS

Response to Office Action dated Jul. 5, 2012, from U.S. Appl. No. 13/249,662, filed Jan. 4, 2013, 12 pp.
Office Action from U.S. Appl. No. 13/249,662, dated Nov. 25, 2011, 9 pp.
Response to Office Action dated Nov. 25, 2011, from U.S. Appl. No. 13/249,662, filed Feb. 27, 2012, 10 pp.
Final Rejection from U.S. Appl. No. 13/249,662, dated Feb. 18, 2015, 10 pp.
Office Action from U.S. Appl. No. 13/249,662, dated Jul. 5, 2012, 10 pgs.
Office Action from U.S. Appl. No. 13/249,662, dated Jul. 21, 2014, 8 pp.
Response to Office Action dated Jul. 5, 2012, from U.S. Appl. No. 13/249,662, filed Aug. 30, 2012, 5 pp.
Response to Office Action filed Oct. 21, 2014 from U.S. Appl. No. 13/249,662 11 pp.
Response to Office Action dated Jul. 5, 2012, from U.S. Appl. No. 13/249,662, filed Nov. 5, 2012, 11 pp.

* cited by examiner

*Primary Examiner* — Angela A Armstrong
(74) *Attorney, Agent, or Firm* — Shumaker & Sieffert, P.A.

(57) ABSTRACT

Aspects of this disclosure are directed to establishing a telephonic communication between a first computing device and a second device and receiving, with the first computing device, a command that defines a function to be performed. When the command comprises a voice command, the function defined in the voice command may be performed. When the command does not comprise the voice command, it may be determined that the command comprises an instruction to perform the function after an occurrence of a future condition. The function defined by the command may be performed after the occurrence of the future condition.

19 Claims, 4 Drawing Sheets

PERFORMING FUNCTIONS BASED ON COMMANDS IN CONTEXT OF TELEPHONIC COMMUNICATION

TECHNICAL FIELD

This disclosure relates to computing devices, and, more particularly, to computing devices responsive to voice commands.

BACKGROUND

Devices such as mobile devices perform various functions. For example, such devices may initiate and receive telephonic communications, display image content such as documents, e-mails, and pictures on a screen, and download information and applications from the Internet. In some examples, a device may be configured to accept a voice command and perform a function in response to the voice command. For example, the device may be configured to allow a user to speak the voice command "call Bob," and, in response to the voice command, initiate a telephonic communication link by dialing a telephone number of a device associated with the name "Bob."

SUMMARY

In one example, aspects of this disclosure are directed to a method comprising establishing, with a first computing device, a telephonic communication between the first computing device and a second device, receiving, with the first computing device, a command that defines a function to be performed, when the command comprises a voice command, performing the function defined in the voice command, and when the command does not comprise the voice command, determining that the command comprises an instruction to perform the function after an occurrence of a future condition and performing the function defined by the command after the occurrence of the future condition.

In another example, aspects of this disclosure are directed to a computer-readable storage medium comprising instructions that, when executed, cause one or more processors to perform operations comprising establishing, with a first computing device, a telephonic communication between the first computing device and a second device, receiving, with the first computing device, a command that defines a function to be performed, when the command comprises a voice command, performing the function defined in the voice command, and when the command does not comprise the voice command, determining that the command comprises an instruction to perform the function after an occurrence of a future condition and performing the function defined by the command after the occurrence of the future condition.

In another example, aspects of this disclosure are directed to a system comprising a receiver that receives a command that defines a function to be performed, a processor that establishes a telephonic communication between the first computing device and a second computing device, and means for performing the function defined in the command when the command comprises a voice command, and performing the function defined by the command after an occurrence of a future condition when the command does not comprise the voice command, wherein, when the command does not comprise the voice command, the processor determines that the command comprises an instruction to perform the function after the occurrence of the future condition.

Aspects of this disclosure may provide one or more advantages. For instance, the techniques of this disclosure may allow a device to receive a voice command that commands the device to perform a function when the device is performing a different function or based on a future condition. As one example, a user of the device may not need to wait for the future condition to occur, and then instruct the device to perform the function. Rather, the user may predefine what functions the device should perform when the future condition occurs. As another example, the user may not need to physically interact with the device to cause the device to perform a different function. Rather, the user may be able to cause the device to perform a function by stating the function while the device is performing a different function.

The details of one or more aspects of this disclosure are set forth in the accompanying drawings and the description below. Other features, objects, and advantages of the disclosure will be apparent from the description and drawings, and from the claims.

DETAILED DESCRIPTION

Non-limiting aspects of this disclosure are directed to techniques for receiving one or more commands that command a device to perform a function when the device is performing a different function or based on a future condition. For example, the device may be a cellular telephone. The user of the cellular telephone may use the cellular telephone to make a phone call. In the middle of the phone call, the user may provide a voice command that states "device, download the music application." In this example, the voice command may cause the cellular telephone to perform a function, e.g., download the music application, while the cellular telephone is performing a different function, e.g., transmitting and receiving the speech of the telephone conversation.

In some examples, the user may provide a voice command to command the device to perform a function based on an occurrence of a future condition. For instance, the user may initiate a phone call and provide the voice command that states "if call goes to voicemail, then text 'See you at 8.'" In this example, the phone call going to voicemail may be the occurrence of the future condition.

Figure 1:
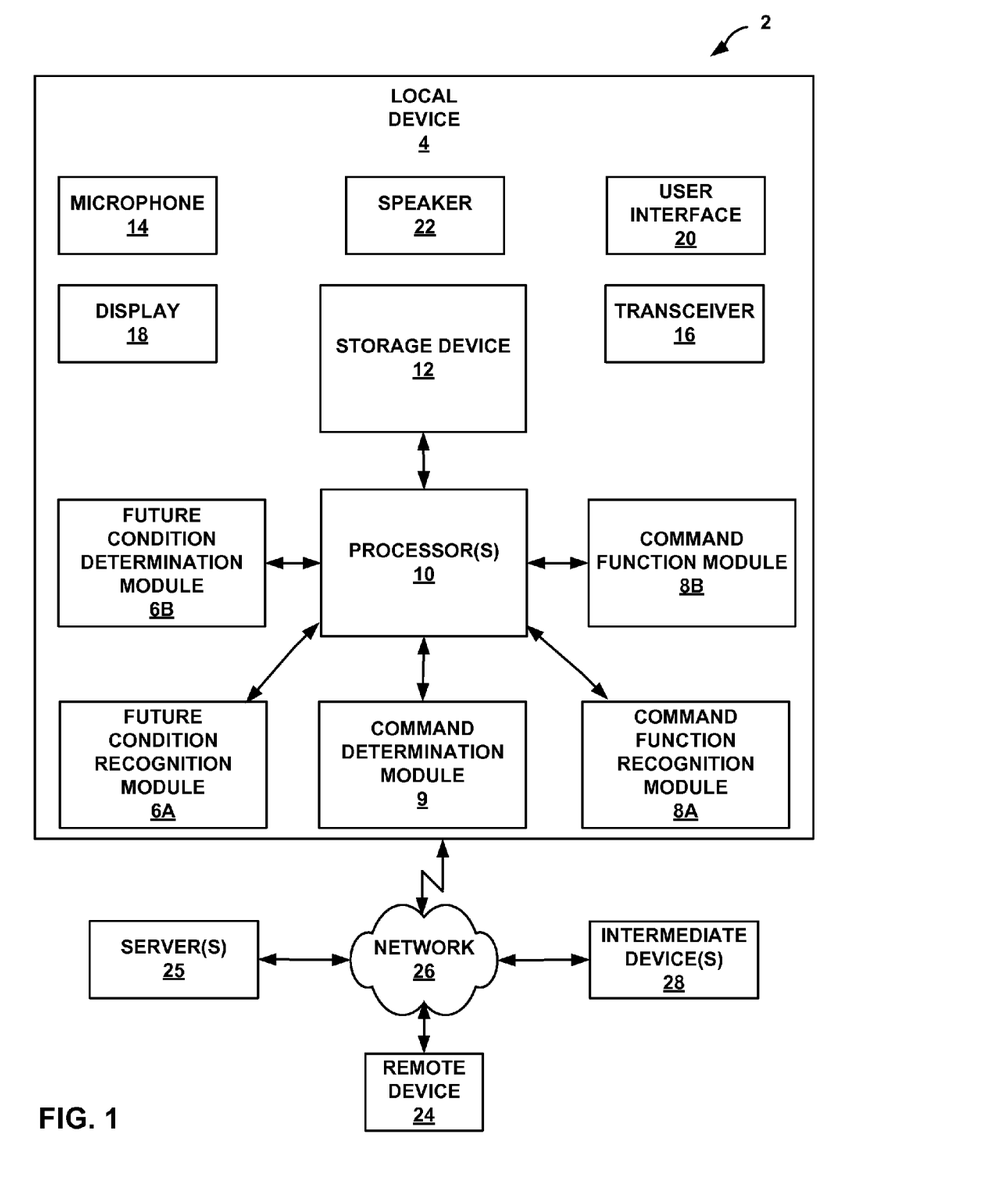
FIG. 1 is a block diagram illustrating an example communication system for reception of a command and the performance of a function defined in the command in accordance with one or more aspects of this disclosure.

FIG. 1 is a block diagram illustrating an example communication system for reception of a command and the performance of a function defined in the command in accordance with one or more aspects of this disclosure. As illustrated in FIG. 1, communication system 2 may include local device 4, remote device 24, one or more servers 25, one or more intermediate devices 28, and network 26. Examples of local device 4, remote device 24, and one or more intermediate device 28 may include, but are not limited to, portable or mobile devices such as cellular phones, personal digital assistants (PDAs), laptop computers, portable gaming devices, portable media players, e-book readers, watches, as well as non-portable devices such as desktop computers. In some examples, one or more intermediate devices 28 may be servers that are independent from servers 25 or a part of servers 25.

As described in more detail, in some examples, local device 4 may establish a telephonic communication with remote device 24. Local device 4 may also receive a command that defines a function to be performed. In some examples, the command may be a voice command; however, aspects of this disclosure are not so limited. In some alternate examples, the command may be a textual command received by local device 4, or some other command.

In some examples, as described below, when the command comprises a voice command, local device 4, or some other device, such as one or more intermediate devices 28, may perform the function defined in the voice command. In some examples, local device 4 or one or more intermediate devices 28 may perform the function defined in the voice command during the telephonic communication, or after the completion of the telephonic communication.

In some examples, also as described below, when the command does not comprise a voice command, e.g., the command is a textual command or some other command, local device 4 or one or more intermediate devices 28 may determine that the command comprises an instruction to perform the function after an occurrence of a future condition. Local device 4 or one or more intermediate devices 28 may perform the function defined by the command after the occurrence of the future condition. For instance, the occurrence of the future condition may function as a trigger for local device 4 or one or more intermediate devices 28 to perform the function defined by the command in some non-limiting examples where the command does not comprise a voice command.

Local device 4 and remote device 24 may be the same or different types of devices. For example, local device 4 and remote device 24 may both be cellular phones. In another example, local device 4 may be a cellular phone and remote device 24 may be a laptop computer. For purposes of illustration only in this disclosure, local device 4 and remote device 24 are described as mobile devices, but aspects of this disclosure should not be considered limited to mobile devices.

Local device 4 and remote device 24 are coupled to network 26 via wired or wireless links or both. Network 26 may include a telephone network such as a cellular telephone network, a wide-area network such as the Internet, a local-area network (LAN), an enterprise network, or one or more other types of networks. Local device 4 and remote device 24 establish telephonic communications or transmit and receive data using network 26.

As illustrated in FIG. 1, local device 4 may include command determination module 9, future condition recognition module 6A, future condition determination module 6B, command function recognition module 8A, command function module 8B, one or more processors 10, storage device 12, microphone 14, transceiver 16, display 18, user interface 20, and speaker 22.

Although shown as separate components in FIG. 1, in some examples, one or more of future condition recognition module 6A, future condition determination module 6B, command function recognition module 8A, command function module 8B, and command determination module 9 may be part of the same module. In some examples, one or more of future condition recognition module 6A, future condition determination module 6B, command function recognition module 8A, command function module 8B, command determination module 9, and one or more processors 10 may be formed in a common hardware unit. In some instances, one or more of future condition recognition module 6A, future condition determination module 6B, command function recognition module 8A, command function module 8B, and command determination module 9 may be software units that are executed on one or more processors 10.

Local device 4 may include additional components not shown in FIG. 1 for clarity. For example, local device 4 may include a battery to provide power to the components of local device 4. Similarly, the components of local device 4 may not be necessary in every example of local device 4. For example, if local device 4 comprises a desktop, local device 4 may not include a display 18.

Microphone 14 accepts audio input, and is one example of a receiver with which local device 4 may receive commands. For example, microphone 14 may be used to receive voice commands from a user of local device 4. In some examples, local device 4 includes more than one microphone 14. In such examples, the multiple microphones 14 may be used to receive voice commands from the user, record audio in stereo, enable noise cancellation, or both.

Speaker 22 may be used to provide audio output. For instance, in examples where local device 4 is a cellular telephone, speaker 22 may be used to provide the audio output of the telephonic communication. In some examples, one or more processors 10 may cause speaker 22 to output an audio feedback in response to a voice command given to local device 4. For example, a user of local device 4 may provide the voice command "device, download the music application" while the device is being used for telephonic communications. In such an example, one or more processors 10 may cause speaker 22 to provide the audio output "are you sure you want to download the music application?"

User interface 20 may allow a user of local device 4 to interact with local device 4. User interface 20 may be another example of a receiver with which the user may provide a command to local device 4. For example, user interface 20 may allow a user of local device 4 to provide a command that defines a function to be performed. Examples of user interface 20 may include, but are not limited to, a keypad embedded on local device 4, a keyboard, a mouse, a roller ball, buttons, or other devices that allow a user to interact with local device 4. In some examples, user interface 20 includes microphone 14 to allow a user to provide voice commands.

Display 18 may be a liquid crystal display (LCD), e-ink, or other display. Display 18 may present the content of local device 4 to a user. For example, display 18 may present confirmation messages, output of applications executed on local device 4 such as a web browser, or other functions that may need to be presented to a user. In some examples, display 18 may provide some or all of the functionality of user interface 20. For example, display 18 may be a touch screen that can allow a user to interact with local device 4.

Transceiver 16 may be configured to transmit data to and receive data from remote device 24 or one or more servers 25. Transceiver 16 may also be configured to establish a telephonic communication with remote device 24. As used in the disclosure, the phrase "establish telephonic communication" means local device 4 initiating a telephone call with remote device 24 with transceiver 16, or receiving a telephone call from remote device 24 with transceiver 16. For example, a user may cause local device 4 to initiate a telephone call to remote device 24 with transceiver 16. As another example, a user of remote device 24 may place a telephone call to local device 4, and the user of local device 4 may "pick up" the telephone call from remote device 24 with transceiver 16. In either example, e.g., initiating a call, or receiving a call, local device 4 may be considered as establishing a telephonic communication.

Transceiver 16 may support wireless or wired communication, and may include appropriate hardware and software to provide wireless or wired communication. For example, transceiver 16 may include one or more of an antenna, modulators, demodulators, amplifiers, and other circuitry to effectuate communication between local device 4, remote device 24, one or more intermediate devices 28, or one or more servers 25.

One or more processors 10 may cause transceiver 16 to initiate or receive telephonic communication with remote device 24 (e.g., establish telephonic communication). To receive data from one or more servers or to establish telephonic communication with remote device 24, one or more processors 10 may cause transceiver 16 to transmit a request for data from one or more servers 25 or telephonic communications to remote device 24. Remote device 24 may transmit the requested data or establish the telephonic communications with transceiver 16, and transceiver 16 may transmit the requested data or telephonic communications to one or more processors 10. Similarly, one or more processors 10 may cause transceiver 16 to transmit data to one or more servers 25 or to transmit telephonic communications to remote device 24.

Storage device 12 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital media. Storage device 12 may, in some examples, be considered as a non-transitory storage medium. The term "non-transitory" may indicate that the storage medium is not embodied in a carrier wave or a propagated signal. However, the term "non-transitory" should not be interpreted to mean that storage device 12 is non-movable. As one example, storage device 12 may be removed from local device 4, and moved to another device. As another example, a storage device, substantially similar to storage device 12, may be inserted into local device 4. A non-transitory storage medium may store data that can, over time, change (e.g., in RAM).

In some examples, storage device 12 may store one or more instructions that cause one or more processors 10, command determination module 9, future condition recognition module 6A, future condition determination module 6B, command function recognition module 8A, and command function module 8B to perform various functions ascribed to one or more processors 10, command determination module 9, future condition recognition module 6A, future condition determination module 6B, command function recognition module 8A, and command function module 8B. Storage device 12 may be considered as a computer-readable storage media comprising instructions that cause one or more processors 10, command determination module 9, future condition recognition module 6A, future condition determination module 6B, command function recognition module 8A, and command function module 8B to perform various functions.

One or more processors 10 may include any one or more of a microprocessor, a controller, a digital signal processor (DSP), an application specific integrated circuit (ASIC), a field-programmable gate array (FPGA), or equivalent discrete or integrated logic circuitry. For ease of description, aspects of this disclosure are described in the context of a single processor 10. However, it should be understood that aspects of this disclosure described with a single processor 10 may be implemented in one or more processors.

In some examples, a user may provide a command to local device 4 that defines a function to be performed when local device 4 is performing a different function or based on a future condition. For example, local device 4 may be a cellular telephone. The user of the cellular telephone may use the cellular telephone to make a phone call, e.g., establish a telephonic communication with remote device 24. The user may also provide a command to perform a function based on whether the phone call goes through, e.g., the future condition.

As an example, the command may be a textual command. For instance, a user may provide a textual command using user interface 20. As one example, the command may be a voice command. The command (e.g., textual command or voice command) may include an instruction to perform the function after an occurrence of a future condition. The occurrence of the future condition may, in some examples, trigger the performance of the function.

As one example, the function defined in the command may be performed by local device 4. In some examples, the function defined in the command may be performed by one or more devices, separate from local device 4, such as by one or more intermediate devices 28. For instance, local device 4 may receive a textual or voice command defining a function to be performed. As another example, the function defined in the command may be performed by one or more intermediate devices 28 that are connected to local device 4 by network 26. In this manner, local device 4 may offload the performance of the function to one or more intermediate devices 28.

In some examples, command determination module 9 may be configured to determine whether a voice command has been provided to local device 4. For example, local device 4 may be configured to differentiate between a voice command and conversational speech provided during a telephone call. A voice command, as used in this disclosure, means a command for local device 4 to perform a function defined in the voice command. Conversational speech, as used in this disclosure, means speech that normally occurs during telephone conversations. For example, conversational speech would not command local device 4 to perform a function.

For instance, the user of local device 4 may state "device, download a music application" while the user is conversing with the user of remote device 24 in the telephone call. As one example, local device 4 may be configured to recognize that whenever the word "device" occurs in the call, that it is a command for the device to perform a function, and not part of the conversational speech. As another example, the user of local device 4 may state "how are you doing?" while the user is conversing with the user of remote device 24 in the telephone call. In this example, the phrase "how are you doing?" may not include any trigger that causes local device 4 to recognize that it received a voice command.

In some examples, command determination module 9 may be configured to use a database of functions and future conditions and voice commands associated with the functions and future conditions to differentiate between a voice command and conversational speech provided during a telephone call. For example, a database of functions and associated voice commands (e.g., words or phrases) may be stored, such as in storage device 12. In another example, the database may be located at a remote location, e.g., one or more servers 25, that local device 4 can access, such as by using network 26.

Command determination module 9 may use voice recognition techniques on the speech provided during the telephone call to recognize certain words in the speech and to differentiate between conversational speech and voice command. If, for example, command determination module 9 determines that a word or phrase provided in the speech matches a word or phrase in the database, it may flag the word or phrase as being part of a voice command, and separate from conversational speech. Command determination module 9 may also flag such a word or phrase as a function or future condition for further processing, such as by one or more of future condition recognition module 6A, future condition determination module 6B, command function recognition module 8A, or command function module 8B.

For instance, the database may contain certain words or phrases associated with the function of sending a text message. The database may, in some examples, associate the word "text," and the phrase "send text" with the function of sending a text message. In such an example, the command determination module 9 may determine that a voice command associated with sending a text message has been provided to local device 4 when the command determination module 9 recognizes the word "text" or the phrase "send text" in the speech of the telephone call and the word "text" or phrase "send text" is determined to be present in the database. Similarly, using the association of the word or phrase in such a database with a function, the command determination module 9 may determine that the word or phrase is associated with a function rather than a future condition. There may be other techniques to determine whether a voice command has been provided to local device 4, and examples of this disclosure are not limited to the above examples.

To ensure that local device 4 does not inadvertently perform a function the user did not desire, in some aspects, local device 4 may receive confirmation from the user. The user confirmation may be verbal, may utilize a button press using user interface 20, or both. For instance, the user may state "device, download a music application." In response, local device 4 may output a confirmation message that states "are you sure you want the music application." For example, local device 4 may output the statement on display 18. In another example, local device 4 may provide the statement as an audio message using speaker 22. In some examples, local device 4 may provide the statement both as an audio message and a visual message using display 18. The user may confirm that local device 4 should download the music application or provide feedback that the user does not wish to download the application. As one example, the user may enter a confirmation button indicating "yes" or "no", such as by using user interface 20. As another example, the user may verbally confirm or deny by saying "yes," or "no."

In this manner, in some instances, the user may be able to confirm that the user provided a voice command that is separate from the conversational speech. For instance, it may be possible that during conversation, the user states a word or phrase that corresponds to trigger word or phrase, e.g., a word or phrase in the database, as described above. However, the user may not have intended to provide a voice command, and the trigger word or phrase may be part of conversational speech. User confirmation may allow the user to authenticate whether the user intended to provide a voice command. However, user confirmation may not be necessary in every example described in this disclosure.

In some examples, local device 4 may receive an indication from a user that local device 4 will receive a voice command. For example, prior to providing a voice command, a user may provide an indication that the user is about to provide a voice command. Using the indication, local device 4 may determine that the speech following the indication is a voice command rather than conversational speech.

Examples of such an indication may include, but are not limited to, holding down a button on a keypad of local device 4 for a predefined amount of time, pressing a button such as on user interface 20, or shaking local device 4. In some examples, a user may provide a verbal indication that local device 4 will receive a voice command, such as by providing a verbal key word. For instance, a user may precede a voice command with the word "device." Local device 4 may determine that the speech following the word "device" is a voice command rather than conversational speech.

In some examples, local device 4 may receive confirmation that the voice command is part of the telephonic communication while performing the function defined in the voice command. For example, local device 4 may determine that it has received a voice command defining a function to be performed. In response, local device 4 may begin performing the function defined in the voice command and may provide a confirmation message to the user allowing the user to cancel the performance of the function. For instance, the confirmation message may be provided as a textual message using display 18, as an audio message using speaker 22, or both. In such an example, local device 4 may perform the function unless local device 4 receives a confirmation to cancel performance of the function. The confirmation message may be received as an audio message, such as by using microphone 14. In an example, the confirmation message may be received as a button press, such as by using user interface 20. There may be different example techniques for the device to confirm that the user desires the device to perform a function, and examples of this disclosure are not limited to the above examples.

In some examples, command determination module 9 may be configured to determine whether a command provided to local device 4 is a function to be performed or to be performed after the occurrence of a future condition. For instance, during the telephonic communication or while local device 4 is establishing a telephonic communication link, local device 4 may receive a command that defines a function to be performed.

In some examples, the command may be a textual command. For example, a user may type the command using a keypad of local device 4. As one example, the command may be a voice command. In some examples, the command may include a command to perform the function during the telephonic communication. In some alternate examples, the command may include a command to perform the function after an occurrence of a future condition defined in the command that occurs after completion of the telephonic communication. In these alternate examples, the command may define an occurrence of the future condition, and the occurrence of the future condition may function as a trigger for local device 4 to perform the function defined in the command. In these alternate examples, the performance of the function defined in the command may be contingent upon the occurrence of the future condition.

For instance, in some examples command determination module 9 may determine that the words "if" or "when" are indications of a future condition. For example, a user may initiate a telephone call with local device 4 and may provide the command "if call goes to voicemail, text 'See you at 8'".

Command determination module 9 may determine that the portion of the command "call goes to voicemail" is a future condition because it is preceded by the word "if." Similarly, a user may provide the command "press 5 when call goes through." In such an example, command determination module 9 may determine that the portion of the command "call goes through" is a future condition because it is preceded by the word "when."

In some examples, command determination module 9 may be configured to determine that one or more portions of a command are functions to be performed rather than future conditions. For instance, command determination module 9 may determine that those portions of a command that are not future conditions may be functions. As above, in the example where a user provides the command "if call goes to voicemail, text 'See you at 8,'" the device may determine that the portion of the command "if call goes to voicemail" is a future condition. Based on that determination, command determination module 9 may determine that the portion of the command "text 'See you at 8'" is a function because it is not part of the future condition.

In some instances, command determination module 9 may be configured to differentiate between a function and a future condition using a database of functions and future conditions and commands associated with the functions and future conditions. For example, a database of functions, future conditions, and associated commands may be stored, such as in storage device 12 or in a remote location that local device 4 can access. In the example where the command is a voice command, command determination module 9 may use voice recognition techniques to compare speech provided by a user to members of the database. As one example, the command may be provided as a textual command, such as by using user interface 20. In such an example, command determination module 9 may compare the text of the command to members of the database to differentiate between a function and a future condition.

In an example, the database may contain words or phrases associated with future conditions, such as "if call goes through," "if call goes to voicemail," or "when download completes." Similarly, the database may contain words or phrases associated with functions to be performed, such as "text", "send text," "download," "call," or "press." Command determination module 9 may differentiate whether portions of a command are associated with functions to be performed or future conditions based upon a comparison of portions of the command to the database. There may be different example techniques for the command determination module 9 to differentiate between functions and future conditions, and examples of this disclosure are not limited to the above examples.

In some aspects, future condition recognition module 6A may be configured to determine what the future condition represents and whether it is possible for local device 4 to determine if the future condition has occurred. For example, a user may provide the command "when music application download completes, launch the music application." As discussed above, the command determination module 9 may determine that the portion of the command "download completes" may be a future condition. Future condition recognition module 6A may determine the event that is represented by the phrase "download completes," and whether the occurrence of the event can be determined by local device 4.

In some examples, future condition recognition module 6A may determine the event that a future condition represents by using a database of known events and words or phrases that are associated with those events. For example, the database may contain one or more of the phrases "goes to voicemail," or "voicemail picks up," and may associate those phrases with the event of a voicemail message being provided by a remote device, such as by remote device 24. In such an example, future condition recognition module 6A may determine if the occurrence of the event can be detected by local device 4. For instance, future condition recognition module 6A may determine that those events contained in the database are able to be detected by local device 4 and those events not in the database cannot be detected.

In one example, a user may provide the command "if call goes to voicemail, email Brian 'I'll be back around 4 this afternoon.'" Future condition recognition module 6A may use a database of known future conditions and associated events to determine that the future condition "if call goes to voicemail" is associated with the event of a voicemail message being provided by a remote device. In addition, future condition recognition module 6A may determine that because such an event is contained in the database, local device 4 is capable of determining whether the future condition has occurred.

If a future condition is not contained in a database of known events, in some examples, future condition recognition module 6A may associate a future condition with an event by determining that the future condition is similar to an event contained in the database. For example, a user may provide the command "if Bob isn't home, text Bob 'I'll be there soon.'" If, for example, the future condition "isn't home" is not contained in a database of known events, future condition recognition module 6A may determine that the future condition "isn't home" is similar to the future condition "goes to voicemail" because the command, e.g., text, that follows the future condition is part of the database, and is generally associated with "goes to voice mail." In such an example, future condition recognition module 6A may determine that the future condition "isn't home" may be associated with the event of a voicemail message being provided by a remote device.

Future condition recognition module 6A may determine that the occurrence of an event associated with a future condition cannot be determined by local device 4, in some examples. For instance, a user may provide the command "if Bob is driving, then text Bob 'I'll be there soon.'" In such an example, future condition recognition module 6A may determine that the occurrence of the future condition "Bob is driving" cannot be determined by local device 4. Such a determination may be made, in one example, because the word "driving" is not contained in a database of known events.

Future condition determination module 6B may be configured to determine if a future condition has occurred. As an example, if the future condition represents a call going to voicemail, future condition determination module 6B may be able to determine that the call went to voicemail based on the received speech from remote device 24. For instance, voicemail messages may be a standard voicemail message. Local device 4 may be able to recognize that the telephone call went to voicemail by parsing the voicemail message and recognizing that the voicemail message is a standard voicemail message. In an example, the received voicemail message may be compared against a database of standard voicemail messages to make the determination.

For customized voice mail messages, future condition determination module 6B may be configured to recognize certain common statements in most speech when a phone goes to voicemail. For example, voicemail messages typically contain language similar to "please leave a message."

Future condition determination module 6B may parse the voicemail message and recognize the phrase "please leave a message."

In some examples, command function recognition module 8A may be configured to determine the function defined by a command. In some examples, command function recognition module 8A may be configured to determine if a function defined in a command is able to be performed by local device 4 or one or more intermediate devices 28.

As one example, command function recognition module 8A may be configured to determine the function defined by a command using a database of known functions and words or phrases associated with those functions. In an example, the database may be stored in storage device 12 of local device 4. In an alternate example, the database may be stored remotely, such as in one or more servers 25. Command function recognition module 8A may compare the speech of a voice command or the text of a textual command to the database to determine the function defined by the command.

For example, a user may provide the command "email Bob 'Postpone the meeting until 1.'" Command function recognition module 8A may compare the content of the command (e.g., the speech of a voice command or text of a textual command) to a list of known events and may determine that the word "email" appears in the database of known events. In such an example, command function recognition module 8A may determine that the function to be performed is to send an email.

Similarly, command function recognition module 8A may determine that the name "Bob" is associated with an email address in a database of known contact information. Command function recognition module 8A may determine that the function to be performed is to send an email to the email address in the database of known contact information associated with the name "Bob," the email containing the textual content "Postpone the meeting until 1."

Examples of functions that may be performed by local device 4 or one or more intermediate devices 28 may include, but are not limited to, initiating or disconnecting telephonic communications, sending text messages, simulating button presses, downloading or uploading documents, information, and applications to or from one or more servers 25, sending emails, attaching documents and information to emails, and launching or terminating applications. There may be other functions that may be performed by local device 4 or one or more intermediate devices 28, and examples of this disclosure are not limited to the above examples. For example, one or more servers 25 may store music files, movie files, or other such media content. The user of local device 4 may be able to cause local device 4 or one or more intermediate devices 28 to download media content from one or more servers 25 during the telephonic communication. One or more servers 25 may be configured to store content other than media content as well.

In some examples, command function module 8B may be configured to perform the function defined by the command. Command function module 8B may be configured to perform the function when local device 4 is performing a different function. For example, in examples where local device 4 is a cellular phone, local device 4 may initiate telephonic communications with another device, such as remote device 24. A user may provide a command such as "email Brian 'I'll be there soon.'" In such an example, command function module 8B may be configured to perform the function of sending an email while local device 4 is performing a different function, e.g., sending and receiving telephonic communications to and from remote device 24. In some examples, the functions performed by command function module 8B may be performed by one or more intermediate devices 28.

In some instances, command function module 8B may be configured to perform a function defined by a command at a time substantially similar to a time at a conclusion of the reception of the command and during the telephonic communication. For example, during a telephone call, a user may provide the command "download the music application." The command may be provided as a voice command or as a textual command. Command function module 8B may be configured to perform the function of downloading the music application when the command is received, e.g., at a time immediately after or substantially close to the time that the user is finished providing the command. In such an example, command function module 8B may be configured to perform the function of downloading the music application during the telephonic communication.

In other examples, command function module 8B may be configured to perform the function after the occurrence of a future condition defined in the command. For instance, the occurrence of the future condition may trigger the performance of the function by command function module 8B. As one example, command function module 8B may be configured to perform the function after the occurrence of a future condition defined in the command and while local device 4 is performing a different function, such as sending and receiving telephonic communications.

For example, local device 4 may initiate telephonic communications with another device, such as remote device 24. A user may provide the command (e.g., a textual command or voice command), "if Joe picks up, text Bob 'I got in touch with Joe.'" The future condition may be determined to be Joe answering the telephone call and the function may be determined to be sending a text message to Bob with the expressed message. In such an example, the command function module 8B may perform the second function (sending the text message) after the future condition has occurred (Joe answered the phone) and while local device 4 is performing the first function (sending and receiving telephonic communications).

As another example, local device 4 may receive, while local device 4 is performing a first function, a command defining a second function and a future condition associated with the second function. In such an example, the future condition may occur after local device 4 has completed the first function. Command function module 8B may be configured to perform the second function defined by the command after the occurrence of the future condition and after completion of the first function.

For example, local device 4 may initiate, e.g., establish, a telephonic communication link with a device such as remote device 24. During the initiation of the telephonic communication link or during the telephonic communications (the first function), local device 4 may receive a command to perform a second function such as sending a text message if the call goes to voicemail. In such an example, command function module 8B may be configured to perform the second function of sending the text message after completion of the first function, e.g., disconnecting the telephonic communication link.

Figure 2:
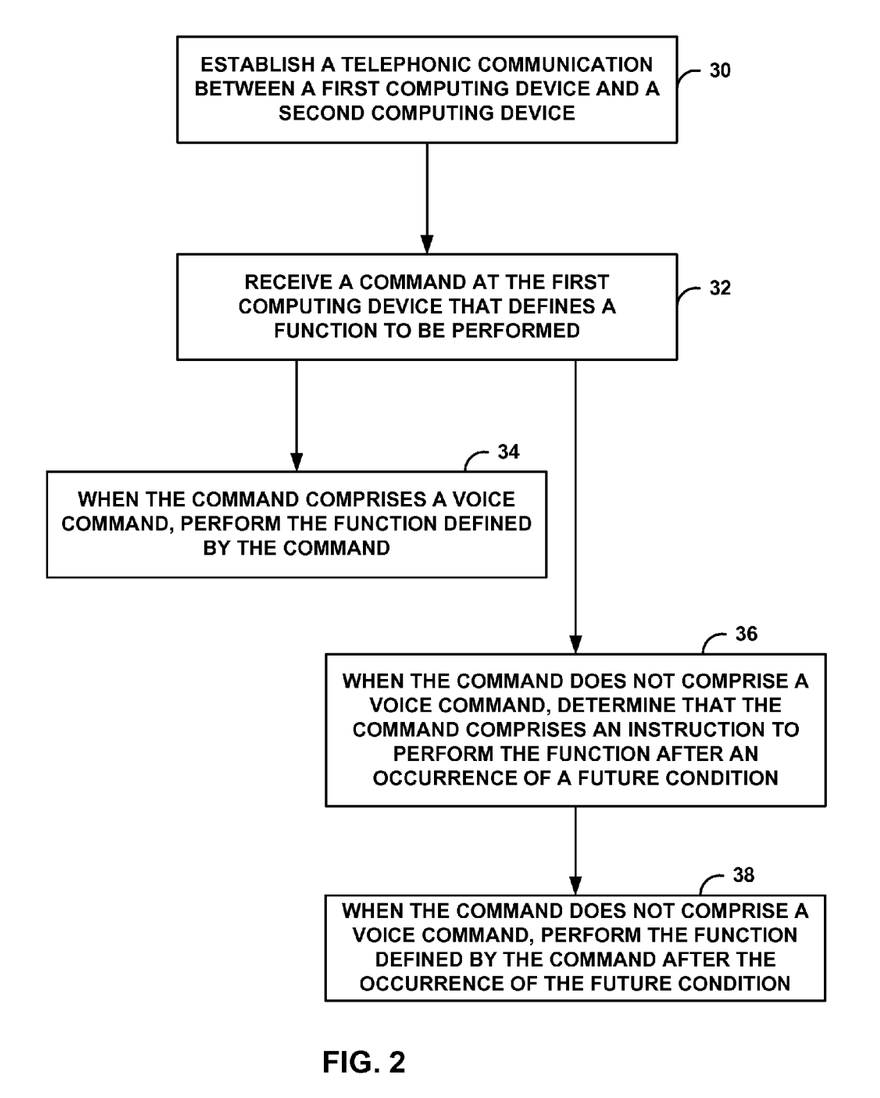
FIG. 2 is a flow chart illustrating an example operation of a device, in accordance with one or more aspects of this disclosure.

FIG. 2 is a flow chart illustrating an example operation of a device, in accordance with one or more aspects of this disclosure. A telephonic communication link may be established between a first computing device and a second computing device (30). For example, a telephonic communication link may be established between local device 4 and remote device 24. In some examples, the first computing device may initiate the telephonic communication link with the second device. In some examples, the second computing device may initiate the telephonic communication link with first device. In either example, the first device may be considered as establishing a telephonic communication link.

A command may be received at the first computing device that defines a function to be performed (32). In some examples, the command may be a voice command, a textual command, or any other type of command. In some examples, the command may define a future condition when the function of the command should be performed. In some alternate examples, the command may not define the future condition.

In some examples, when the command comprises a voice command, the function defined by the command may be performed (34). In some examples, the voice command received at the first computing device may define a function to be performed with the first computing device. As an example, a user may provide the voice command "download the mapping application" to the first computing device, such as to local device 4. The first computing device may perform the function of downloading the mapping application, such as by using one or more of processor 10, command determination module 9, future condition recognition module 6A, future condition determination module 6B, command function recognition module 8A, or command function module 8B.

In some examples, the function defined in the voice command may be performed by a device separate from local device 4, such as by one or more intermediate devices 28. For purposes of illustrations, some of the below examples are described in the context of local device 4 performing the functions for purposes of illustration and clarity. However, it should be understood that one or more intermediate devices 28 may perform similar functions instead of or in addition to local device 4.

In some examples, the command may be received at the first computing device, such as local device 4, during the telephonic communication. For instance, a user may provide the command (e.g., a textual command or a voice command) "download the mapping application" while the first computing device is being used for telephonic communications.

In some examples, the command may be received at the first computing device, such as local device 4, while the first computing device is establishing the telephonic communication link. For example, a user may use the device to make a phone call, and may provide the command "if call goes to voicemail, email Bob 'I'm running late.'" In such an example, the first computing device may receive the command while the first computing device is establishing the telephonic communication link with the second computing device.

In some examples, the command received at the first computing device may define a function to be performed during the telephonic communication. As one example, a user may provide the command "press 5" while the first computing device is being used for telephonic communication. The first computing device may determine that the function to be performed is to simulate the pressing of button 5 on a keypad of the device and may perform the function defined in the voice command during the telephonic communication. For instance, the first computing device may offload the performance of the function to a separate device, such as to one or more intermediate devices 28.

As one example, the command received at the first computing device may define a function to be performed at a time immediately after reception of the command. For instance, in the example of the command "press 5," the first computing device may perform the function of simulating the pressing of button 5 on a keypad of the device immediately after the voice command is provided to the device.

In an example, the command received at the first computing device may define a function to be performed at a time substantially similar to a time at a conclusion of the reception of the voice command. For example, the first computing device may receive the command "email Bill 'I'm here.'" The first computing device may perform the function of sending the email at a time that is substantially similar to the time the device receives the completed voice command (e.g., shortly after receiving the completed command). In some examples, the function may be performed by a device that is separate from local device 4, such as one or more intermediate devices 28.

As described above, in some instances, the command received at the first computing device may define a function to be performed after an occurrence of a future condition defined in the command. As an example, the command may be a voice command or a textual command. The command may define the function to be performed after the occurrence of the future condition defined in the command and after completion of the telephonic communication. For example, a user may provide the command "if call goes to voicemail, text Bill 'I must have just missed you.'" In such an example, the first computing device, such as local device 4, may determine that the function to be performed is to send the text message and the future condition is if the call goes to voicemail. The first computing device, or a separate device such as one or more intermediate devices 28, may perform the function of sending the text message after completing the telephonic communication by disconnecting from the telephonic communication link (e.g., hanging up).

In other examples, the command received at the first computing device may define a function to be performed after the occurrence of a future condition and during the telephonic communication. For example, while the first computing device is being used for telephonic communication, a user may provide the command "if call lasts longer than ten minutes, text Mary 'I'm running late.'" In such an example, the first computing device, or a separate device such as one or more intermediate devices 28, may perform the function of sending the text message after the occurrence of the future condition (e.g., after the length of the call exceeds 10 minutes) and during the telephonic communication.

As an example, the first computing device, such as local device 4, may receive multiple commands. Such multiple commands may each define functions to be performed with the first computing device. The multiple commands may each define future conditions after the occurrence of which the functions are to be performed. For example, the first computing device may receive a first command defining a first function to be performed. In some examples, the first command may include a command to perform the first function at a time immediately after, or substantially similar to a time at a conclusion of the reception of the first command. In some instances, the first computing device may receive a second command defining a second function to be performed. The commands may be voice commands or textual commands. The first computing device, or a separate device such as one or more intermediate devices 28, may perform the first function, the second function, or both, during the telephonic communication or after completion of the telephonic communication.

An example of multiple commands provided to the first computing device may arise in the context of a user navigating a phone tree of an automated telephone answering system. Many telephone answering systems provide callers the options of reaching different parties or different options within the answering system by pressing or saying an appropriate number. For example, a user may call a credit card customer service telephone number. The credit card customer service line may utilize an automated telephone answering system.

In such an example, the user may be presented with a tree of options to reach the appropriate party at the credit card company or to retrieve the desired information. For example, the automated answering system may provide a message directing the user to "press 1 for billing inquiries, press 2 for balance inquiries, or press 3 to speak with a customer service representative." If the user presses 1, for instance, the automated system may provide the user with more directions, such as "enter account information." In such an example, a user may know in advance the options or directions that will be presented by the automated answering service. For example, the user may have used the automated system in the past and may have memorized the options presented in the phone tree. In an example, the user may provide a first command (e.g., a voice command or a textual command) to the first computing device when calling the automated system, such as "when the line picks up, press 1." The user may provide a second command to the first computing device, such as "enter account information."

In some examples, such as the phone tree example above, local device 4 or one or more intermediate devices 28 may be able to perform one or more functions based on a single command. For example, a user, when calling an automated answering service such as the credit card customer service line, may provide the command "check balance." In an example, the device may associate the function "check balance" with the appropriate button press or series of presses required to navigate the phone tree to check the user's credit balance. The appropriate button press or series of presses may be stored in the first computing device, such as in storage device 12 of local device 4. In some examples, the appropriate button press or series of presses may be stored in a remote location, such as one or more servers 25, that the first computing device can access, such as by using network 26. In some examples, the sequence of button presses required to navigate a phone tree may be provided by the user and stored for later user. In other examples, the sequence of button presses may be provided as part of a database of known phone trees.

In some aspects of this disclosure, when the command does not comprise a voice command, a determination may be made that the command comprises an instruction perform the function after an occurrence of a future condition (36). When the command does not comprise a voice command, the function defined by the command may be performed after the occurrence of the future condition (38). For example, utilizing the techniques described above, a determination of when the future condition occurred may be made. In turn, the occurrence of the future condition may function as a trigger for local device 4 or one or more intermediate devices 28 to perform the functions.

Figure 3:
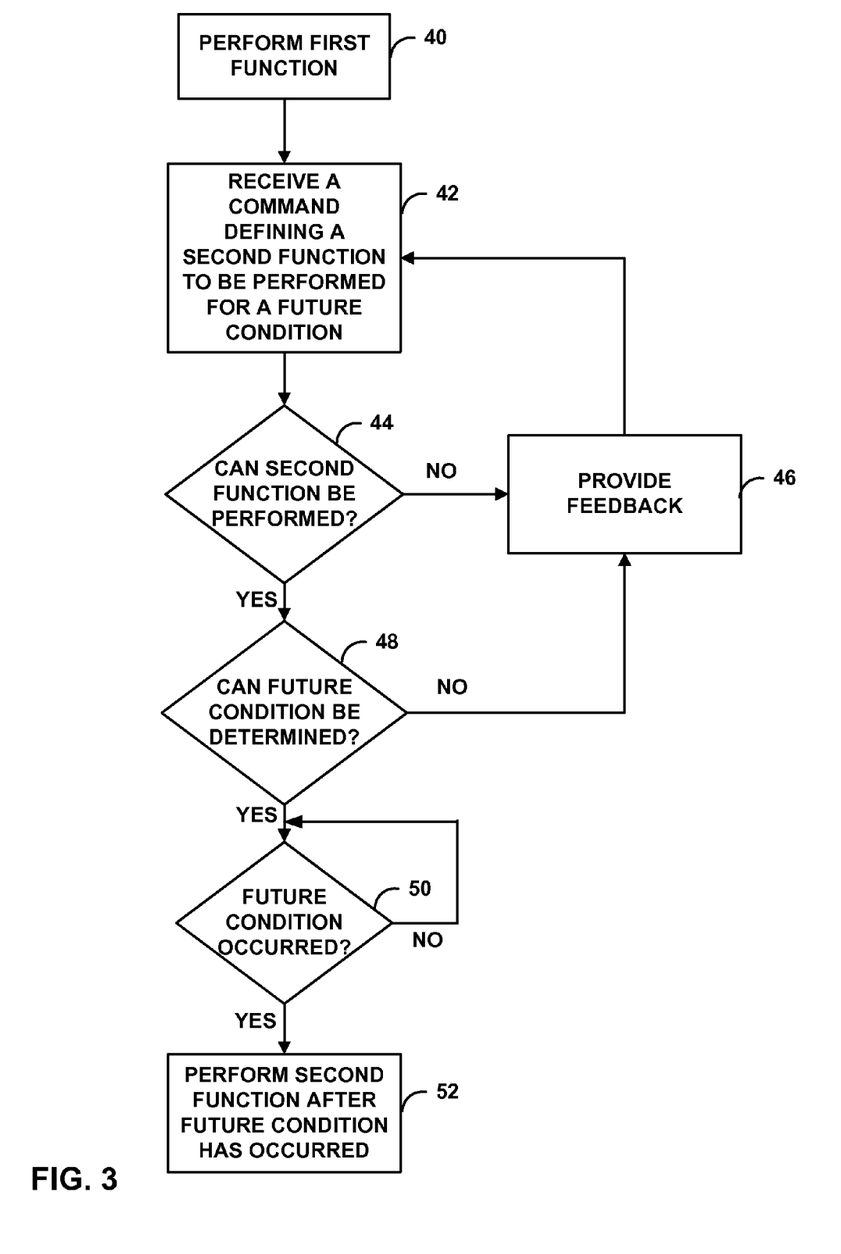
FIG. 3 is a flow chart illustrating another example operation of a device, in accordance with one or more aspects of this disclosure.

FIG. 3 is a flow chart illustrating an example operation of a device, in accordance with one or more aspects of this disclosure. A first function may be performed (40). As one example, a computing device such as local device 4 may perform a first function such as establishing a telephonic communication link with a second computing device. A command may be received defining a second function to be performed for a future condition (42). For example, a command (e.g., a voice command or a textual command) may be received at the first computing device while the first computing device is performing the first function. The command may define a second function to be performed after the occurrence of a future condition defined in the command. For instance, in the example where the first computing device is a cellular phone, the device may receive a command to perform a second function after the occurrence of a future condition defined in the command and while the first computing device is sending and receiving telephonic communications (e.g., the first function). In an example, the command may include the function of sending a text message after the occurrence of the future condition that the call goes to voicemail.

In some examples, a confirmation may be received to determine whether the command received by the first computing device is part of the telephonic communication. For example, to ensure that a first computing device, such as local device 4, does not inadvertently perform a function the user did not desire, the device may receive confirmation from the user. The confirmation may be verbal, may utilize a button press using user interface 20, or both. For instance, the user may state "device, download a music application." In response, the first computing device may output a confirmation message that states "are you sure you want to perform the function 'download a music application?'" An example of user confirmation is described in more detail with respect to FIG. 4A.

As another example, the device may output the confirmation message both as a verbal message and as a message displayed on display 18. In such an example, a user may answer the confirmation message either by selecting a confirmation button or by verbally answering the question.

A determination of whether the second function can be performed may be made (44). For example, a first computing device such as local device 4 may determine the second function defined by the command, such as by using one or more of command determination module 9 and command function recognition module 8A. The device may determine whether the second function can be performed by the first computing device or a separate device such as one or more intermediate devices 28. Such a determination may be made, for example, by using command function recognition module 8A.

In some examples, the first computing device may determine that the second function cannot be performed by the first computing device or by one or more intermediate devices 28. For example, the first computing device may determine that the second function defined in the command is associated with the function of sending an email to a name that does not appear in a known database of contact information, and therefore that the device cannot perform the function of sending the email without the appropriate email address. In another example, the first computing device may determine that the second function cannot be performed by the first computing device or by one or more intermediate devices because the function is not recognized by the first computing device. In such an example, the function may be unrecognized by the device because the function is not contained in a database of known functions.

In some examples, if the first computing device cannot perform the function defined in the command ("NO" branch of 44), the first computing device may provide feedback that the second function defined in the command cannot be performed (46). An example of the feedback provided by local device 4 is provided with respect to FIG. 4B.

If the first computing device can perform the function defined in the command ("YES" branch of 44), a determination of whether the future condition can be determined may be made (48). For example, a first computing device such as local device 4 may determine what future condition is defined by the command, such as by using one or more of command determination module 9 and future condition recognition module 6A. The device may determine whether the future condition can be determined by the first computing device such as by using future condition recognition module 6A.

In some examples, the first computing device may determine that the future condition cannot be determined by the first computing device ("NO" branch of 48). As one example, the first computing device may determine that the future condition defined in the command is associated with the event of determining whether the user of a remote device is driving. The device may determine, for example, that the future condition cannot be determined by the device because the event associated with the future condition is not contained in a database of known events.

In some examples, the first computing device may provide feedback that the future condition defined in the command cannot be determined (46). An example of providing feedback that the future condition defined in the voice command cannot be determined is provided with respect to FIG. 4C.

If the first computing device determines that the future condition can be determined by the first computing device ("YES" branch of 48), a determination of whether the future condition has occurred may be made (50). As an example, if the future condition represents a call going to voicemail, the device may be able to determine that the call went to voicemail based on the received speech from the remote device. For instance, the device may be able to recognize that the telephone call went to voicemail by parsing a voicemail message and recognizing that the voicemail message is a standard voicemail message. As another example, the device may parse the voicemail message and recognize a common phrase associated with voicemail messages, such as the phrase "please leave a message." In other examples, the device may determine the occurrence of future conditions associated with events such as the completion of a download of a document or other data, the length of time of a telephonic communication link, the establishing of a telephonic communication link, or others. There may be other future conditions that may be determined by the device, and examples of this disclosure are not limited to the above examples.

If the future condition occurred ("YES" branch of 50), the second function may be performed after the future condition has occurred (52). In some examples, the second function may be performed by the first computing device, such as local device 4. In some examples, the second function may be performed by a device, separate from the first computing device, such as one or more intermediate devices 28.

In an example, the second function may be performed at a time immediately after the occurrence of the future condition. As an example, the second function may be performed at a time substantially similar to a time that the future condition has occurred. In some examples, if the future condition has not occurred, the first computing device, such as local device 4, may perform different functions, or remain idle until the future condition occurs ("NO" branch of 50).

Figure 4A:
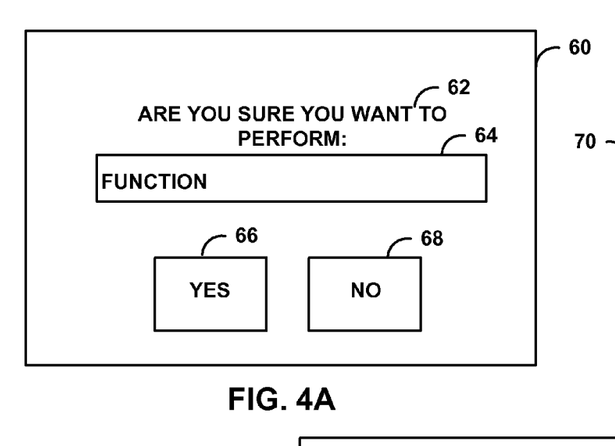
FIG. 4A is a screen illustration of outputting a confirmation message in accordance with one or more aspects of this disclosure.

FIG. 4A is a screen illustration of outputting a confirmation message in accordance with one or more aspects of this disclosure. In the example of FIG. 4A, a confirmation message 60 may be displayed, such as on display 18 of local device 4. The confirmation message 60 includes a text field 62, an output field 64, a confirmation button 66, and a confirmation button 68. Text field 62 may display text that forms part of a question to be posed to a user. In the example of FIG. 4A, text field 62 displays the text "ARE YOU SURE YOU WANT TO PERFORM:" Output field 64 may display text representing the function that the device has determined is defined in a command. For example, when the device has determined that the command defines the function of downloading a music application, output field 64 may display the text "DOWNLOAD A MUSIC APPLICATION?". In such an example, text field 62 in combination with output field 64 would display the text "ARE YOU SURE YOU WANT TO PERFORM: DOWNLOAD A MUSIC APPLICATION?". Confirmation button 66 and confirmation button 68 may allow a user to answer the question by selecting one of the confirmation buttons. In the example of FIG. 4A, confirmation button 66 displays the text "YES" and confirmation button 68 displays the text "NO". As one example, a user may confirm whether the voice command received by the first computing device is part of the telephonic communication by selecting the appropriate confirmation button.

In some examples, the device may output the confirmation message as a verbal message. For example, the device may output the message "Are you sure you want to perform the function download a music application" as an audio message such as by using speaker 22 of local device 4. The device may receive an answer to the confirmation message as a verbal answer, such as by using microphone 14 of local device 4. In such an example, a user may say the word "yes" or the word "no" to answer the confirmation message.

Figure 4B:
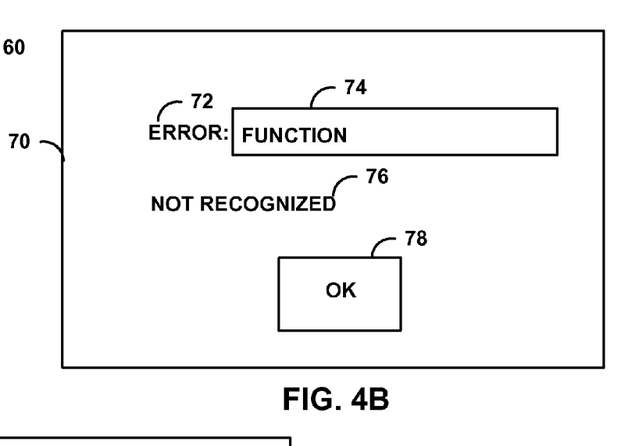
FIG. 4B is a screen illustration of outputting a confirmation message in accordance with one or more aspects of this disclosure.

FIG. 4B is a screen illustration of outputting a confirmation message in accordance with one or more aspects of this disclosure. In the example of FIG. 4B, a confirmation message 70 may be displayed, such as on display 18 of local device 4. The confirmation message 70 includes a text field 72, an output field 74, a text field 76, and a confirmation button 78. In the example of FIG. 4B, text field 72 displays the text "ERROR:". Output field 74 may display text representing the function that the device has determined is defined in a command. For example, when the device has determined that a command defines the function of downloading a music application, output field 74 may display the text "DOWNLOAD A MUSIC APPLICATION". Output field 76 displays the text "NOT RECOGNIZED." In such an example, text field 72 in combination with output field 74 and text field 76 would display the text "ERROR: DOWNLOAD A MUSIC APPLICATION NOT RECOGNIZED." Confirmation button 78 may allow a user to confirm that the message has been received by the user.

Figure 4C:
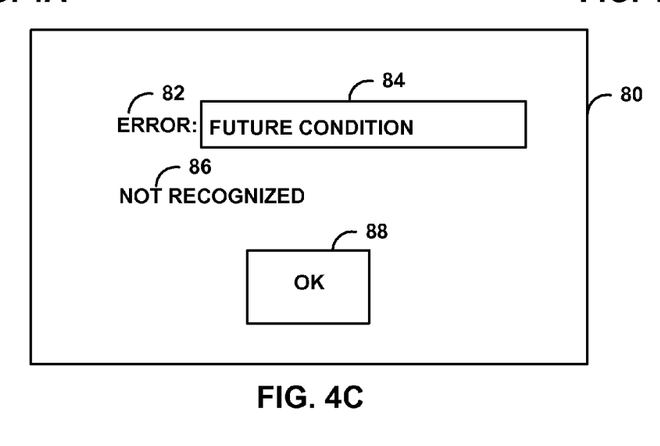
FIG. 4C is a screen illustration of outputting a confirmation message in accordance with one or more aspects of this disclosure.

FIG. 4C is a screen illustration of outputting a confirmation message in accordance with one or more aspects of this disclosure. In the example of FIG. 4C, a confirmation message 80 may be displayed, such as on display 18 of local device 4. The confirmation message 80 includes a text field 82, an output field 84, a text field 86, and a confirmation button 88. In the example of FIG. 4C, text field 82 displays the text "ERROR:". Output field 84 may display text representing the future condition that the device has determined is defined in a command. For example, when the device has determined that a command defines the future condition of determining whether a user of a remote device is driving, output field 84 may display the text "IF BOB IS DRIVING". Output field 86 displays the text "NOT RECOGNIZED." In such an example, text field 82 in combination with output field 84 and text field 86 would display the text "ERROR: IF BOB IS DRIVING NOT RECOGNIZED." Confirmation button 88 may allow a user to confirm that the message has been received by the user.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may comprise a computer data storage medium such as RAM, ROM, NVRAM, EEPROM, FLASH memory, magnetic or optical data storage media, and the like. The code or instructions may be software and/or firmware executed by processing circuitry including one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects have been described in this disclosure. These and other aspects are within the scope of the following claims.

The invention claimed is:

1. A method comprising:
    initiating, with a first computing device, a telephonic communication between the first computing device and a second device;
    during the telephonic communication:
        receiving, with the first computing device, one or more spoken words; and
        determining that the one or more spoken words are associated with a voice command rather than with conversational speech occurring during the telephonic communication, wherein determining that the one or more spoken words are associated with the voice command comprises:
            determining that the one or more spoken words comprise an instruction to perform a function after an occurrence of a future condition;
            outputting a confirmation message that includes information representing the function to be performed after the occurrence of the future condition; and
            responsive to outputting the confirmation message, receiving a confirmation from a user that the one or more spoken words are associated with the voice command comprising the instruction to perform the function after the occurrence of the future condition;
        determining the occurrence of the future condition; and
        performing the function after the occurrence of the future condition.

2. The method of claim 1, wherein performing the function comprises performing the function with the first computing device.

3. The method of claim 1, wherein performing the function comprises performing the function with a third device separate from the first computing device and the second device.

4. The method of claim 1, wherein performing the function comprises performing the function during the telephonic communication.

5. The method of claim 4, wherein the time corresponding to the conclusion of the reception of the voice command comprises a time immediately after reception of the voice command.

6. The method of claim 1, wherein the voice command comprises a first voice command, and wherein the function comprises a first function, the method further comprising:
    during the telephonic communication, receiving a second voice command that defines a second function; and
    performing the second function.

7. The method of claim 6, wherein performing the second function comprises performing the second function during the telephonic communication or after completion of the telephonic communication.

8. The method of claim 1, wherein receiving the confirmation that the one or more spoken words are associated with the voice command comprises receiving the confirmation while performing the function.

9. The method of claim 1,
    wherein outputting the confirmation message comprises outputting a visual confirmation on a display of the first computing device that includes one or more confirmation buttons, and
    wherein receiving the confirmation that the one or more spoken words are associated with the voice command comprises receiving, with the first computing device, selection of at least one of the one or more confirmation buttons.

10. The method of claim 1,
    wherein outputting the confirmation message comprises outputting, with the first computing device, a verbal confirmation that includes a question of whether the one or more spoken words are associated with the voice command, and
    wherein receiving the confirmation that the one or more spoken words are associated with the voice command comprises receiving, with the first computing device, an answer to the question.

11. The method of claim 1, wherein determining the occurrence of the future condition comprises determining the occurrence of the future condition during the telephonic communication.

12. A non-transitory computer-readable storage medium comprising instructions that, when executed, cause one or more processors of a first computing device to perform operations comprising:
    initiating a telephonic communication between the first computing device and a second device;
    during the telephonic communication:
        receiving one or more spoken words; and
        determining that the one or more spoken words are associated with a voice command rather than with conversational speech occurring during the telephonic communication, wherein determining that the one or more spoken words are associated with the voice command comprises:
            determining that the one or more spoken words comprise an instruction to perform a function after an occurrence of a future condition;
            outputting a confirmation message that includes information representing the function to be performed after the occurrence of the future condition; and responsive to outputting the confirmation message, receiving a confirmation from a user that the one or more spoken words are associated with the voice command comprising the instruction to perform the function after the occurrence of the future condition;

determining the occurrence of the future condition; and performing the function after the occurrence of the future condition.

13. The non-transitory computer-readable storage medium of claim 12, wherein determining the occurrence of the future condition comprises determining the occurrence of the future condition during the telephonic communication.

14. The non-transitory computer-readable storage medium of claim 12, wherein outputting the confirmation message comprises outputting a visual confirmation on a display of the first computing device that includes one or more confirmation buttons, and wherein receiving the confirmation that the one or more spoken words are associated with the voice command comprises receiving, with the first computing device, selection of at least one of the one or more confirmation buttons.

15. The non-transitory computer-readable storage medium of claim 12, wherein outputting the confirmation message comprises outputting a verbal confirmation that includes a question of whether the one or more spoken words are associated with the voice command, and wherein receiving the confirmation that the one or more spoken words are associated with the voice command comprises receiving an answer to the question.

16. A first computing device, comprising:

a receiver configured to receive one or more spoken words;

a transceiver configured to initiate a telephonic communication between the first computing device and a second computing device; and one or more processors configured to:

during the telephonic communication:

determine that the one or more spoken words are associated with a voice command rather than with conversational speech occurring during the telephonic communication, wherein the one or more processors are configured to determine that the one or more spoken words are associated with the voice command at least by:

determining that the one or more spoken words comprise an instruction to perform a function after an occurrence of a future condition;

outputting a confirmation message that includes information representing the function to be performed after the occurrence of the future condition; and responsive to outputting the confirmation message, receiving a confirmation from a user that the one or more spoken words are associated with the voice command comprising the instruction to perform the function after the occurrence of the future condition;

determine the occurrence of the future condition; and perform the function after the occurrence of the future condition.

17. The first computing device of claim 16, wherein the one or more processors are configured to determine the occurrence of the future condition at least by determining the occurrence of the future condition during the telephonic communication.

18. The first computing device of claim 16, wherein the one or more processors are configured to output the confirmation message at least by outputting a visual confirmation on a display of the first computing device that includes one or more confirmation buttons, and wherein the one or more processors are configured to receive the confirmation that the one or more spoken words are associated with the voice command at least by receiving, with the first computing device, selection of at least one of the one or more confirmation buttons.

19. The first computing device of claim 16, wherein the one or more processors are configured to output the confirmation message at least by outputting a verbal confirmation that includes a question of whether the one or more spoken words are associated with the voice command, and wherein the one or more processors are configured to receive the confirmation that the one or more spoken words are associated with the voice command at least by receiving an answer to the question.

\* \* \* \* \*